(12) United States Patent
Thomas

(10) Patent No.: US 7,557,754 B2
(45) Date of Patent: Jul. 7, 2009

(54) METHOD FOR USE IN A MULTILATERATION SYSTEM AND A MULTILATERATION SYSTEM

(75) Inventor: David Wynne Thomas, Romsey (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 11/998,403

(22) Filed: Nov. 30, 2007

(65) Prior Publication Data

US 2008/0129601 A1    Jun. 5, 2008

(30) Foreign Application Priority Data

Dec. 1, 2006   (GB)  ..................... 0623980.0

(51) Int. Cl.
*G01S 3/02*     (2006.01)

(52) U.S. Cl. ....................... 342/465; 342/457

(58) Field of Classification Search ............ 342/442, 342/450, 457, 463, 465; 455/456.1, 457
See application file for complete search history.

(56) References Cited

U.S. PATENT DOCUMENTS

| | | | |
|---|---|---|---|
| 5,164,668 A | 11/1992 | Alfors | |
| 5,166,694 A | 11/1992 | Russell et al. | |
| 5,880,367 A | 3/1999 | Vaughn | |
| 6,043,645 A | 3/2000 | Oudet et al. | |
| 6,198,275 B1 | 3/2001 | Wolf et al. | |
| 6,282,427 B1 | 8/2001 | Larsson et al. | |
| 6,408,246 B1 | 6/2002 | Fox | |

FOREIGN PATENT DOCUMENTS

| | | |
|---|---|---|
| CN | 1434663 A | 8/2003 |
| DE | 298 21 513 U1 | 12/1998 |
| GB | 2 250 154 A | 5/1992 |
| GB | 2 427 973 A | 1/2007 |
| JP | 9-68567 | 3/1997 |
| KR | 20010064885 A | 7/2001 |

OTHER PUBLICATIONS

English translation of the portion of the German Document No. DE 29821513 (Document AH cited in IDS filed Nov. 30, 2007) (Eight (8) pages).
J. Brooks Chadwick et al. "A Vehicle Location System (VLS) Solution Approach" IEEE, Mar. 20, 1990, pp. 127-132.
Partial European Search Report dated Nov. 26, 2007 (Nine (9) pages).

*Primary Examiner*—Dao L Phan
(74) *Attorney, Agent, or Firm*—Crowell & Moring LLP

(57) ABSTRACT

Groupings of receivers for determining a target location by a multilateration system are selected to give the best geometric dilution of precision result by eliminating the receiver that makes the greatest contribution to such dilution. In this way the groups to be used may be selected as appropriate for the location of the target in real time, avoiding the requirement to have a database holding the groupings to be used.

7 Claims, 3 Drawing Sheets

METHOD FOR USE IN A MULTILATERATION SYSTEM AND A MULTILATERATION SYSTEM

This invention relates to a method and apparatus for use in a multilateration system for determining a position of an object and also relates to a multilateration system itself.

BACKGROUND OF THE INVENTION

Multilateration systems are used to provide, in particular, the position of aircraft in flight or on airport runways. A signal transmitted by a transmitter on the aircraft is received by a number of receiver stations at known locations. The signal is transmitted by a 1090 MHz Secondary Surveillance Radar (SSR) transponder and is one of a number of known code types or formats Mode A/C and mode S. By comparing the time of arrival of the signal at each of the receiver stations and with the knowledge of their locations it is possible to calculate the position of the aircraft at the time of transmission. Such a system and a multilateration technique is described in UK patent document GB2250154.

It will be appreciated that in order to accurately determine the position of an aircraft, it is necessary to account for variations in apparent path length between parts of the system, so that a meaningful difference in time of arrival values for the signal can be derived. This can give rise to a factor called group time delay. Aging of components, for example, may cause a variation in the group time delay which may require servicing of parts of the system or other remedial action or correction.

In addition, the group time delay will have an effect on the accuracy of the calculated position of the target. This is called a Geometric Dilution of Precision (GDOP). GDOP will vary depending on the position of the target.

SUMMARY OF THE INVENTION

One object of the present invention is to determine which group of receivers in multilateration system provides the smallest Geometric Dilution of Precision result.

For a given transmission from the target, the central processing unit will receive timing measurements from a sub-set of the total number of receivers. One way to determine the best subset of the available measurements to use would be to provide a map for every possible subset of receivers for which measurements could be received giving the subset of received measurements should be used to give minimum GDOP for every position in the area of interest. However, such a scheme would require a large number of possible groupings where the total number of receivers is large. These groupings are referred to as "maps".

DETAILED DESCRIPTION OF THE INVENTION

Figure 1:
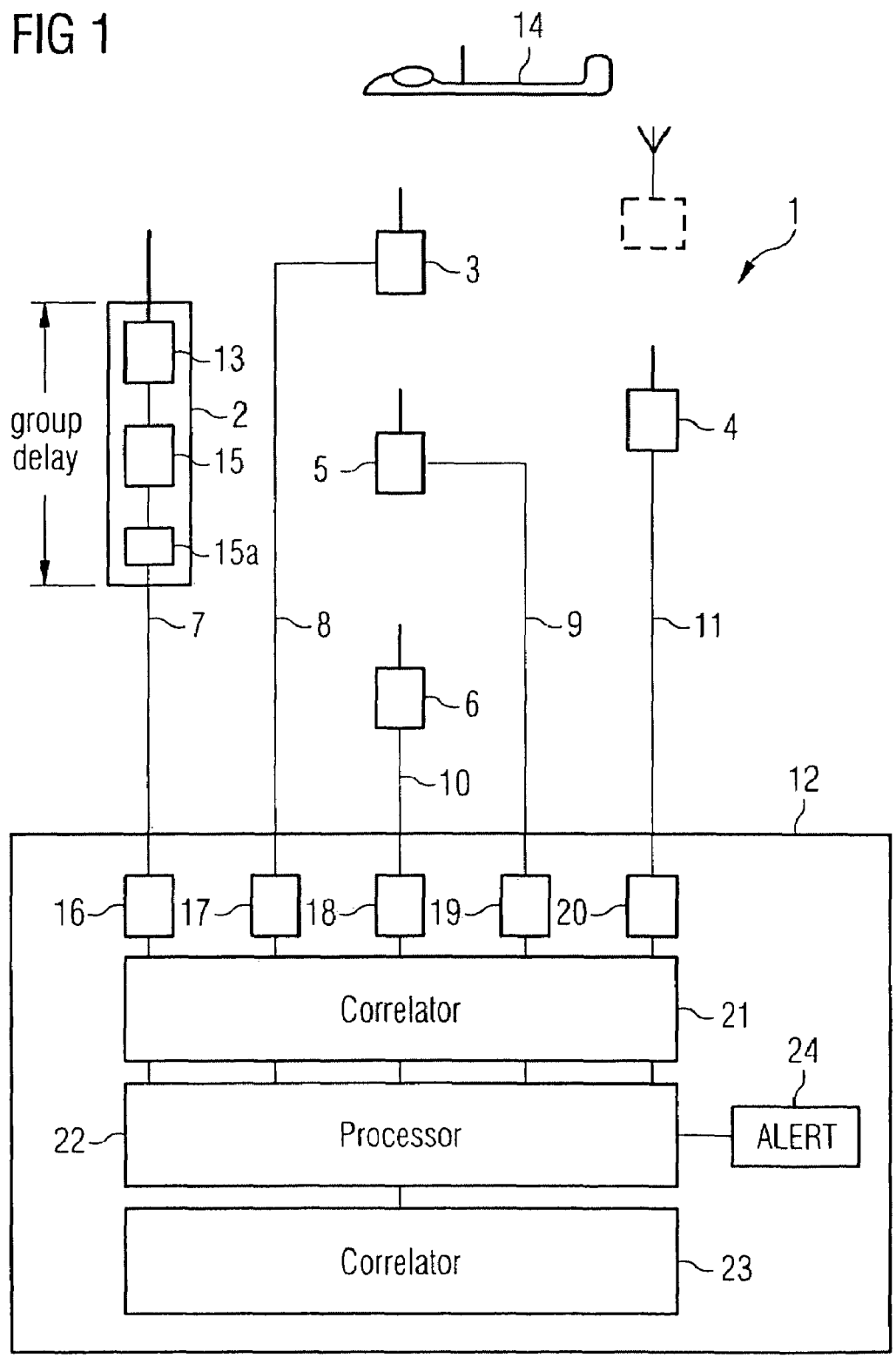
FIG. 1 shows a multilateration system and apparatus in accordance with the invention.

As is shown in FIG. 1, a multilateration system 1 includes five receivers 2 to 6 linked by communication links 7 to 11 (optical fibre) forming a Wide Area Network to a central processing subsystem 12. Each receiver is nominally identical and comprises, as is shown in receiver 2, a receiver section 13 which detects and converts a received RF signal transmitted from an aircraft 14 into a form which is suitable for digitising in digitiser 15. The digitiser 15 performs an analogue to digital conversion and a code extractor 15a, looking for a particular SSR code, detects the code in a time window and transmits a digital signal over the communication path to the central processing subsystem 12 indicating the time of arrival of the code in the window. Within each receiver, there is a delay associated with the sections 13, 15 and 15a called the group delay. This causes an error in the determined time of arrival of a signal as discussed in our co-pending GB application No. 0513483.8. A multilateration technique of a known type is applied to these times of arrival values to determine the position of the aircraft 14 and this is carried out by the central processing subsystem 12.

The central processing subsystem 12 is depicted here as a separate unit but it may be co-located at one of the receivers. It includes a number of ports connected to the communications links 7 to 11. The ports are coupled via filters 16 to 20 to a correlator 21. These filters remove noise from the signals which can lead to positional errors. The correlator 21 correlates the time of arrival data into a set of arrays containing groups of replies that may originate from the same transmission.

The correlated arrays are coupled to a processor 22 which performs a multilateration to derive a position of the aircraft 14 in a known manner and to pass the position data to a tracking application 23 which displays the position to an air-traffic controller.

The processor 22 also provides an output to an alert system 24 which provides an alarm when one of the receivers is detected as having an abnormal group delay. Alternatively, the effect of the group delay can be removed within the multilateration technique performed by processor 22. The group delay detection is carried out by an application running on the processor 22 as described in our co-pending GB application No. 0513483.8.

The processor 22 is also programmed to determine which grouping of receivers to use as the aircraft overflys different geographic regions. In this system the groupings are varied to ensure that the group used is that which gives the best result for a particular location of a target or aircraft.

As an aircraft position changes, the path length to the various positions varies. This leads to a Geometric Dilution of Precision that changes with the location of the target depending upon the group of receivers used. It has been suggested that a series of "maps" could be used to determine the best grouping to use at particular location. This however becomes impractical as the number of receivers increase, particularly as aircraft move in three dimensions.

The number of "maps" required would be $$\sum_{r=5}^{n} \binom{n}{r} = \sum_{r=5}^{n} \frac{n!}{(n-r)! r!} \qquad (1)$$

where n is the total number of receivers. The sum relates to the number of maps required for groups of size r=5 to n. Since a minimum of four receivers is used to calculate a position a decision only needs to be made from groups of received measurements greater than 4.

For ten receivers, six hundred and thirty eight separate subset "maps" would be required. Accordingly, an approach of this nature would require the apparatus to have a large memory capacity to hold the large number of "maps" necessary.

The invention provides a method and apparatus which selects a good receiver subset which may be used in real time for a system utilising a large number of receivers.

For any given subset, in this specific embodiment a receiver to be considered to be the "master" is selected. This is done on the basis of the closest receiver to the median position of the group. In other embodiments a master need not be selected.

Figure 2:
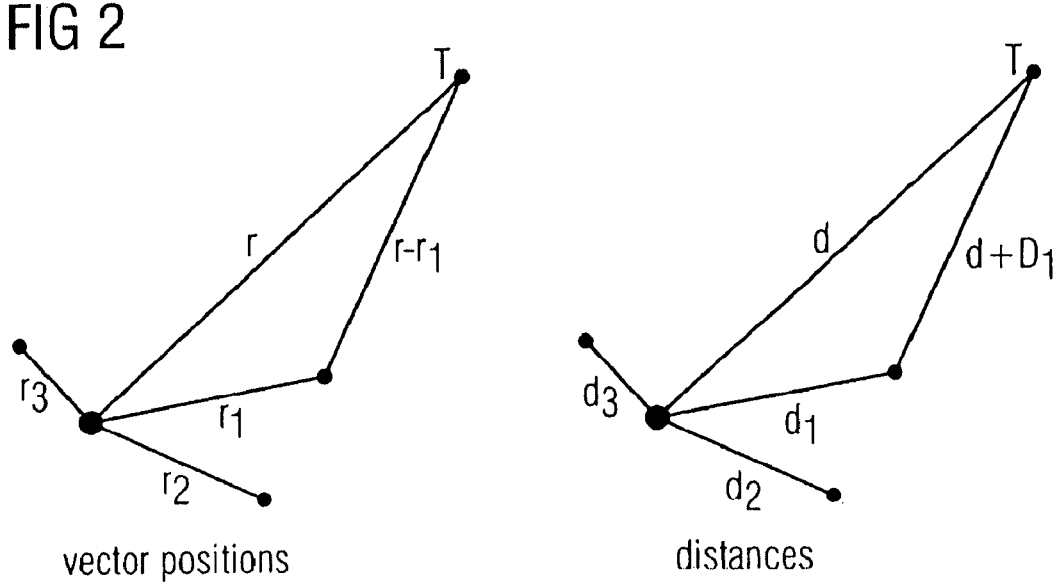
FIG. 2 is a diagram of vector and distances to a target T from four receivers in the system of FIG. 1.

The Geometric Dilution of Precision (GDOP) is caused by the timing errors in each of receivers leading to errors in the calculated target position. The relationship of timing error, to target position is, for a target at position T in FIG. 2 is:

$$\left(R^T + \frac{1}{d}tr^T\right)\partial r = -(T+dI)\partial t$$

where $R=[r_1, r_2, r_3 \ldots r_n]$
  $T=\mathrm{diag}(t)$
  $r_n$=vector position
  I=the Identity matrix $$A = \left(R^T + \frac{1}{d}tr^T\right) \text{ and then}$$

$$\frac{\partial r}{\partial t} = -(A^T A)^{-1} A^T (T+dI) = K$$

where K is a 3 by N matrix with N being the number of slave receivers.

The GDOP contributed by the "slave" receivers of the group is calculated from $$GDOP_{SLAVES} = \sqrt{\sum_{i=1}^{N} k_{i,j}^2}$$

$i = x, y, z$ where x, y and z represent the x, y and z orthogonal planes.
The "master" receiver will also contribute to the GDOP.

$$GDOP_{MASTER} = \mathrm{abs}\left(\sum_{i=1}^{N} k_{i,j}\right)$$

$i = x, y, z$

The overall GDOP is calculated as $$GDOP_{TOTAL} = \sqrt{GDOP_{MASTER}^2 + GDOP_{SLAVES}^2}$$

$$K = \begin{bmatrix} \frac{\partial r_x}{\partial t_1} & \frac{\partial r_x}{\partial t_2} & \cdots & \frac{\partial r_x}{\partial t_N} \\ \frac{\partial r_y}{\partial t_1} & \frac{\partial r_y}{\partial t_2} & \cdots & \frac{\partial r_y}{\partial t_N} \\ \frac{\partial r_z}{\partial t_1} & \frac{\partial r_z}{\partial t_2} & \cdots & \frac{\partial r_z}{\partial t_N} \end{bmatrix}$$

Figure 3:
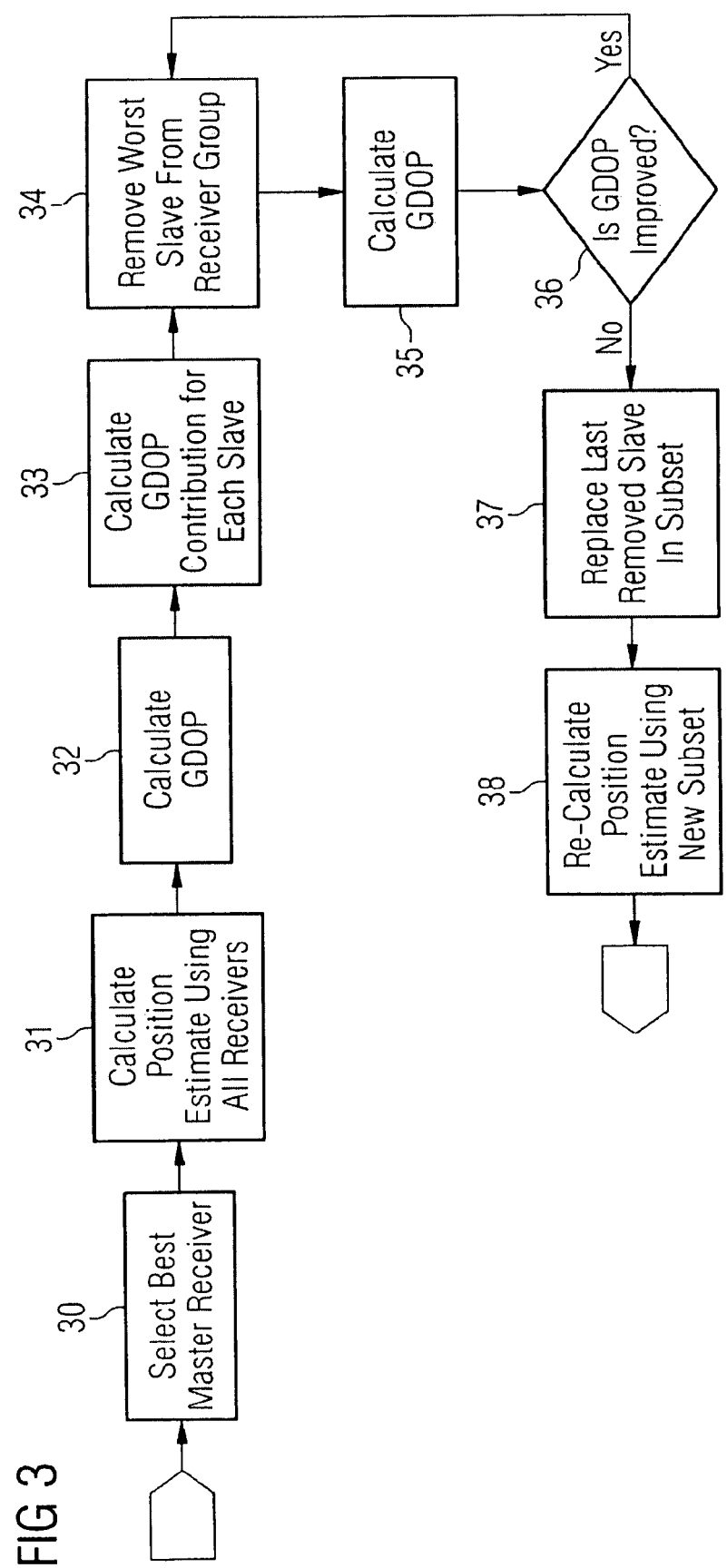
FIG. 3 is an explanatory figure showing the method in accordance with the invention.

As is shown in FIG. 3, the processor 22 runs a program to control group selection for minimising the Geometric Dilution of Precision. This process is carried out periodically as the target travels.

In a first step 30, a receiver of the group is selected as a "master" receiver. The process for doing this is to chose a receiver from the group which is the closest to the mean of the receiver positions.

All the group, including the master, are used to calculate the aircraft's position in step 31 using a standard multilateration technique as, for example, described in GB 2250154.

In step 32, the Geometric Dilution of Precision for the group is determined from the matrix K.

In step 33, the Geometric Dilution of Precision contribution for the slave receivers is determined from $$GDOP_{SLAVES} = \sqrt{\sum_{i=1}^{N} k_{i,j}^2}$$

$i = x, y, z$

In the next step 34, the individual Geometric Dilution of Precision contributions for each slave determined in step 33 are compared to identify the largest value. This is removed from the group by the processor 23.

The modified group is then used, in step 35, to calculate using the K matrix as before) the Geometric Dilution of Precision for the new group.

In step 36, the two Geometric Dilution of Precision values are compared to determine whether or not an improvement has occurred as a result of the modification of the group. That is to say, the Geometric Dilution of Precision value for the new group is smaller than the first group pre-modification as determined at step 32.

If there is an improvement in the Geometric Dilution of Precision, then the process loops back to step 34. The worst receiver in the modified group is removed and the Geometric Dilution of Precision for the further modified group is calculated and compared in step 36 with that derived at step 33.

In the event of the comparison under step 36 resulting in a determination that the Geometric Dilution of Precision is not improved in step 37 (that is to say, the Geometric Dilution of Precision of the modified or further modified group is greater than the Geometric Dilution of Precision calculated in step 32), in step 37 the receiver last removed from the group is replaced. That is to say, the group is reformed to that prior to the last modification.

The reformed group is then used to recalculate the position estimate in step 38.

By performing these calculations in real time, the most appropriate group of receivers can be used to determine the position of the aircraft without the need for a large database of possible groups ("maps") to use.

In alternative embodiments in receiver need not be designated as the "master" by reference to the central position. Rather, one of the receivers may be simply selected without reference to a selection criteria. In essence, the selected receiver is just a primary receiver for the first steps.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of determining a dilution of precision in returning a target position by a multilateration system, said method comprising:
   selecting a primary receiver from a set of receivers;
   forming a first group of receivers, said first group including the primary receiver and others of the set of receivers;
   calculating a position estimate of the target using the first group;
   calculating a geometric dilution of precision for the first group;
   calculating a geometric dilution of precision contribution for each receiver in the first group;
   determining a particular receiver of the first group which has the greatest geometric dilution of precision contribution;
   modifying the first group by removing the particular receiver from the first group to form a modified group;
   calculating a geometric dilution of precision for the modified group;
   comparing the geometric dilution of precision for the first group and the modified group; and
   if the geometric dilution of precision for the modified group is smaller than that for the first group, then calculating a subsequent position estimate of the target using the modified group; and
   if the geometric dilution of precision for the modified group is the same as or larger than that for the first group, then using the first group to calculate a subsequent position estimate of the target.

2. A method as claimed in claim 1 wherein:
   a receiver closest to a geographic mean position of the group of receivers is designated as a master receiver;
   other receivers of the group being are designated as slave receivers; and
   the step of modifying the group requires removal of at least one of the slave receivers.

3. A method as claimed in claim 1 wherein the Geometric Dilution of Precision is derived from $$K = \begin{bmatrix} \frac{\partial r_x}{\partial t_1} & \frac{\partial r_x}{\partial t_2} & \cdots & \frac{\partial r_x}{\partial t_N} \\ \frac{\partial r_y}{\partial t_1} & \frac{\partial r_y}{\partial t_2} & \cdots & \frac{\partial r_y}{\partial t_N} \\ \frac{\partial r_z}{\partial t_1} & \frac{\partial r_z}{\partial t_2} & \cdots & \frac{\partial r_z}{\partial t_N} \end{bmatrix}$$

where $r=[r_x\, r_y\, r_z]^T$=position of the target relative to the master receiver
   and $t_1$=time of reception of signal at receiver I relative to time of reception of signal at master receiver.

4. Apparatus for determining a group of receivers to be used in a multilateration process to derive a position of a target, said apparatus comprising;
   means to accept outputs of the receivers;
   means to allocate at least some of the receivers to a first group;
   means to determine from the outputs of the receiver in the first group a position estimate of the target;
   means to determine a geometric dilution of precision for the first group;
   means to calculate a contribution to the geometric dilution of precision for each receiver in the group of receivers in the first group;
   means to determine a particular receiver of the first group having the greatest contribution to the geometric dilution of precision for the group; said means to allocate being responsive to the determination of the particular receiver to modify the group by removing the particular receiver from the group to create a modified group; and
   means to compare the geometric dilution of precision for the first group and the modified group;
   wherein the means to determine a position estimate of the target is responsive to the means to compare the geometric dilution of precision, and utilizes the first group when the geometric dilution of precision of the first group is smaller than that of the modified group and utilizes the modified group when the geometric dilution of the modified group is smaller than that of the first group.

5. Apparatus as claimed in claim 4, further comprising means to designate a first receiver of the group closest to a geographic mean position of the group as a master receiver, and to designate the remaining group receivers as slave receivers; wherein the means to determine a particular receiver is responsive to the means to designate to select a worst receiver from the slave receivers in the group.

6. A multilateration system comprising apparatus as claimed in claim 5.

7. A multilateration system comprising apparatus as claimed in claim 4.

* * * * *